(12) United States Patent
Uchida et al.

(10) Patent No.: US 6,233,281 B1
(45) Date of Patent: May 15, 2001

(54) VIDEO SIGNAL PROCESSING APPARATUS, AND VIDEO SIGNAL PROCESSING METHOD

(75) Inventors: Hirofumi Uchida, Neyagawa; Keiichi Ishida, Kobe; Tatsushi Bannai, Sakai, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/170,954

(22) Filed: Oct. 13, 1998

(30) Foreign Application Priority Data

Oct. 16, 1997 (JP) .................................................. 9-283826

(51) Int. Cl.$^7$ ...................................................... H04N 7/12
(52) U.S. Cl. ................. 375/240.24; 348/441; 375/240.2; 386/112
(58) Field of Search ..................................... 348/441, 450, 348/458, 556; 375/240.01, 240.12–240.16, 240.18, 240.2, 240.24; 382/232, 236, 238, 248, 250; 386/33, 40, 81, 109–112, 123, 131; H04N 7/12

(56) References Cited

U.S. PATENT DOCUMENTS

| | | | |
|---|---|---|---|
| 5,198,900 | * 3/1993 | Tsukagoshi | 375/240.16 |
| 5,485,216 | * 1/1996 | Lee | 348/441 |
| 5,585,930 | * 12/1996 | Uchida et al. | 386/123 |
| 5,646,695 | * 7/1997 | Fujiwara et al. | 348/556 |
| 5,990,960 | * 11/1999 | Murakami et al. | 375/240.12 |
| 6,028,726 | * 2/2000 | Yanagihara | 386/81 |
| 6,137,953 | * 10/2000 | Fujiwara et al. | 386/109 |

* cited by examiner

Primary Examiner—Richard Lee
(74) Attorney, Agent, or Firm—Burr & Brown (57) ABSTRACT

A video signal processing apparatus which receives a digital video signal having arrangement of pixels frame by frame as an input, performs compressively coding to the digital video signal, and reproduces compressively coded data, comprises blocking unit for performing block dividing process by dividing the video signal of one frame into first blocks having a first format and second blocks having a second format which is different from the first format, performing block changing process by changing the format of the second blocks to the first format, and producing a converted video signal composed of plural blocks having the first format; and compressive coding unit for performing compressive coding including discrete cosine transform process to the converted video signal produced by the blocking unit.

8 Claims, 5 Drawing Sheets

[before macroblock arrangement changing process]

Fig.3 (b)

[after macroblock arrangement changing process]

Fig.3 (c)

[change from block Ai to block Bi]

Fig.3 (d)

[change from block Ai to block Bi]

—— at recording
----- at reproduction

Fig.4 Prior Art

Prior Art

Fig.5 (a)
[before macroblock arrangement changing process]

Fig.5 (b)
[after macroblock arrangement changing process]

Fig.5 (c)
[change from block Ai to block Bi]

Ai
i=0,1,···,7,10,11,···,17

| 0 | 1 | 2 | 3 | 4 | 5 | 6 | 7 | 8 |

→

Bi
i=0,1,···,7,10,11,···,17

| 0 | 1 | 2 |
|---|---|---|
| 3 | 4 | 5 |
| 6 | 7 | 8 |

Fig.5 (d)
[change from block Ai to block Bi including dummy]

i=8,9,18,19

| 0 | 1 | 2 | 3 | 4 | 5 |

→ i=8,9,18,19

| 0 | 1 | 2 |
|---|---|---|
| 3 | 4 | 5 |
| dummy | dummy | dummy |

VIDEO SIGNAL PROCESSING APPARATUS, AND VIDEO SIGNAL PROCESSING METHOD

FIELD OF THE INVENTION

The present invention relates to an apparatus and a method for processing a video signal and, more particularly to an apparatus and a method for processing a video signal, which performs compressively coding to a digital video signal and reproduces the digital video signal from a recording medium.

BACKGROUND OF THE INVENTION

HDTV (High Definition television) is called "second-generation TV", which is far superior to a conventional TV in image and audio qualities and realizes wide screen display. In recent years, with great advance in electronics technologies including digital techniques which are employed to digitize or compress video and audio data, the HDTV has been put into practical use. Accordingly, there has been an increasing need for techniques for transmitting and recording HDTV video, among which a method for performing image compression process to video data of a large capacity has been studied and developed to achieve high efficiency.

Video data is generally recorded in a digital format as follows. A video signal, i.e., an analog signal is first converted into digital image data comprising pixels, which is compressively coded to reduce amount of information, and then recorded and transmitted. In this case, DCT (Discrete Cosine Transform) which plays an important role in image compression process is employed. The DCT process is performed for pixel blocks each comprising (8×8) pixels (8 pixels in the horizontal direction×8 lines aligned in the vertical direction), and for macroblocks each composed of plural pixel blocks. Therefore, prior to DCT process, blocking process is performed to generate these blocks. For the case of performing blocking to an HDTV video signal, the following conversion process is performed.

The recording method for the HDTV signal is described in detail in IEC-61834 as an international standard of digital VTR. Hereinafter, a description will be given of a prior art HDTV signal processing techniques according to an 1125/60 system according to this recording method with reference to FIGS. 4 and 5(a)–5(d). FIGS. 4 and 5(a)–5(d) show block dividing process and block arrangement process according to the prior art HDTV signal processing technique.

Figure 4:
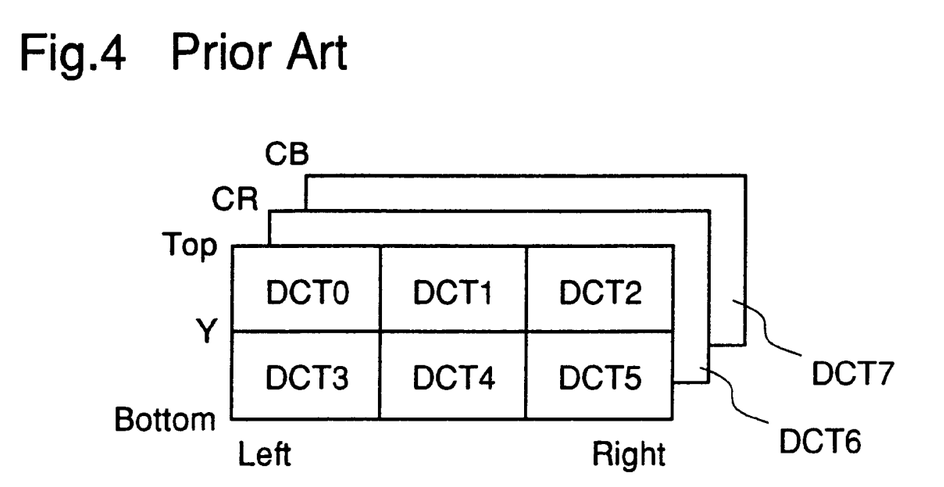
FIG. 4 is a diagram showing a relationship between a macroblock and DCT blocks, in video signal processing according to the prior art.

FIG. 4 shows a target block to be compressively coded according to the prior art. In general, a moving image such as the HDTV video is represented by continuous motion of an image comprising numerous frames, and digital image data corresponding to one frame is decomposed into digital video signals Y, CR, and CB, which are hereinafter referred to as "Y", "CR", and "CB", respectively. The "Y", i.e., a luminance signal has a sampling frequency of 40.5 MHz, and one image thereof comprises (1008×1024) pixels (1008 pixels in the horizontal direction×1024 lines aligned in the vertical direction). The "CB" and "CR", i.e., chrominance signals, respectively have a sampling frequency of 13.5 MHz and one image of each of them comprises (336×512) pixels (336 pixels in the horizontal direction×512 lines aligned in the vertical direction), since every other lines thereof are reduced.

As described above, it is required that the digital video signal be divided into pixel blocks prior to DCT process. The "Y", "CR" and "CB" are respectively divided into pixel blocks each comprising (8×8) pixels. The pixel blocks to be subjected to DCT process are called "DCT blocks". In compressive coding process, a plurality of DCT blocks are generally handled as a macroblock. Referring to FIG. 4, there are shown 6 DCT blocks (DCT 0–5) corresponding to an image comprising (24×16) pixels in "Y", a DCT block (DCT 6) comprising (8×8) pixels in "CR", and a DCT block (DCT 7) comprising (8×8) pixels in "CB". These 8 blocks are handled as a macroblock. Arrangement changing process mentioned later is performed for each macroblock.

Figure 5:
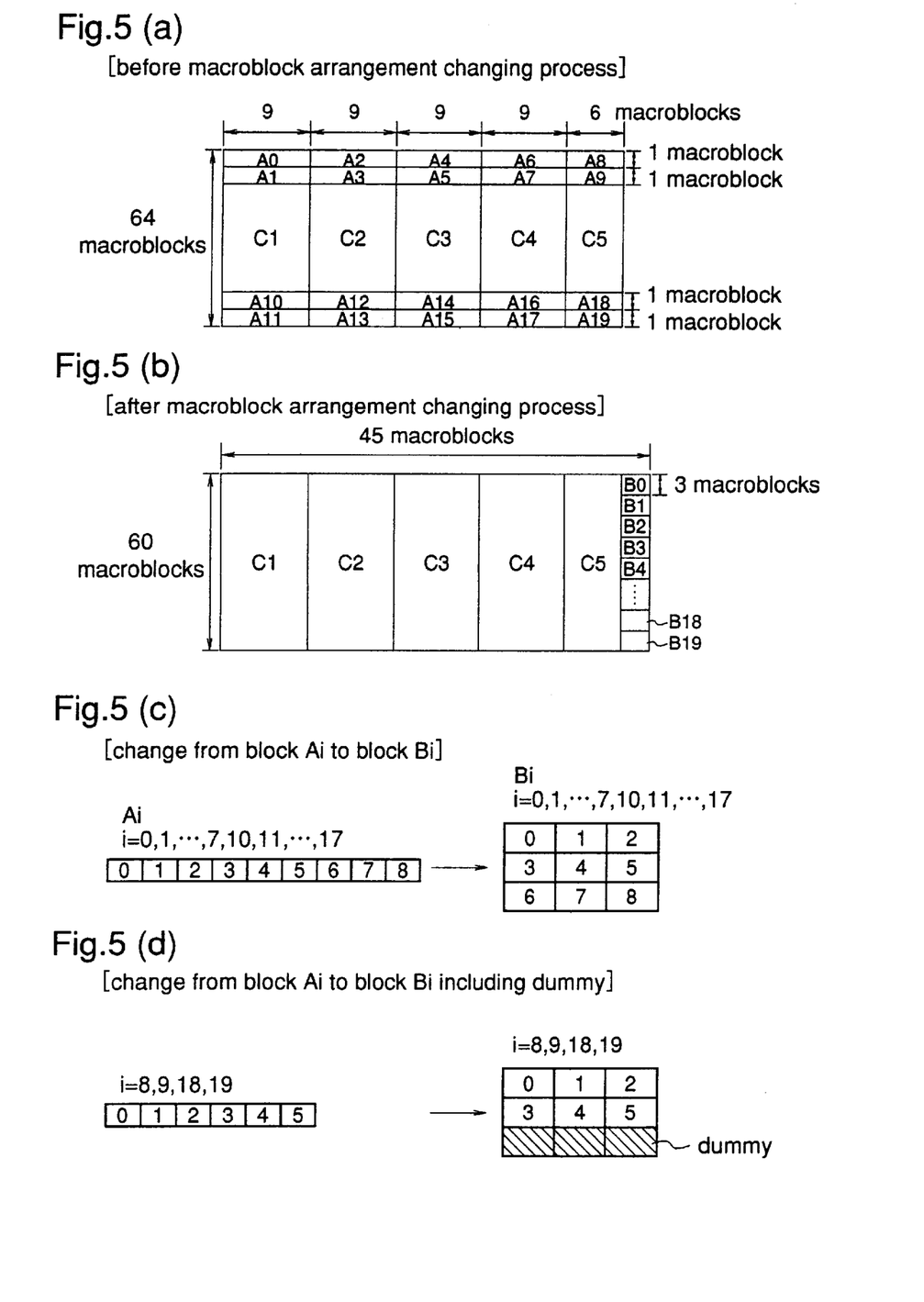
FIGS. 5(a)–5(d) are diagrams showing arrangement of macroblocks and macroblock arrangement changing process in video signal processing according to the prior art.

FIG. 5 shows arrangement of blocks and arrangement changing process in video signal processing according to a prior art.

According to arrangement of macroblocks generated by block dividing process, as shown in FIG. 5(a), upper and lower regions in one image are divided into blocks Ai (i=0–19), and a central region except the upper and lower regions are divided into blocks Ci (i=1–5). The blocks Ai (i=0, 1–7, 10, 11–17) are each composed of (9×1) macroblocks, and the blocks Ai (i=8, 9, 18, 19) are each composed of (6×1) macroblocks. The blocks Ci (i=1–4) are each composed of (9×60) macroblocks, and the block C5 is composed of (6×60) macroblocks. Thus, in a 1125/60 system, it is possible to divide one frame comprising (1008×1024) pixels into (42×64) macroblocks.

Then, arrangement of so divided macroblocks in one frame is changed as follows, for compressive coding process. As shown in FIG. 5(c), the blocks Ai (i=0, 1–7, 10, 11–17) each composed of (9×1) macroblocks are changed into blocks Bi (i=0, 1–7, 10, 11–17) each composed of (3×3) macroblocks. In addition, as shown in FIG. 5(d), the blocks Ai (i=8, 9, 18, 19) each composed of (6×1) macroblocks are changed into blocks Bi (i=8, 9, 18, 19) each composed of (3×3) macroblocks. Sine the macroblocks which belong to the blocks Ai (i=8, 9, 18, 19) are each configured in (6×1) arrangement, 3 dummy macroblocks are used as 3 macroblocks represented by oblique lines in FIG. 5 (d) This changing proces allows the blocks Bi (i=0–19) to be arranged at the right of C5, as shown in FIG. 5(b).

As a result of this rearrangement, the frame composed of (42×64) macroblocks becomes a frame composed of (45×60) macroblocks. Then, according to the arrangement of macroblocks of one image shown in FIG. 5(b), compressive coding including DCT process is performed, and the resulting coded data is recorded in a recording medium such as a magnetic tape.

Thus, in the prior art video signal processing, since it is necessary to divide the video signal into pixel blocks each comprising (8×8) pixels to be subjected to DCT process, and further divide the pixel blocks into macroblocks each comprising (24×16) pixels, the number of the lines aligned Din the vertical direction must be an integer multiple of 16. Although it is possible to divide the image comprising 1024 lines aligned in the vertical direction because the above condition is satisfied, it is impossible to divide an image comprising 1080 lines aligned in the vertical direction illustrated in SMPTE 274M according to an SMPTE standard because it is not satisfied.

For this reason, use of the above recording method does not realize recording in the magnetic tape or the like. As a solution to this, a portion of image data is abandoned.

As concerns a video signal processing apparatus according to the prior art which is capable of processing without abandoning data, a video signal recording apparatus is disclosed in Japanese Published Patent Application No. Hei. 9-46628. The recording apparatus includes an additional video area encoder for coding extra data, and records data in auxiliary video data areas in a recording medium, whereby the data is not abandoned.

However, to realize a recording apparatus which is capable of processing the image composed of 1080 lines aligned in the vertical direction, shown in the SMPTE274M based on a video signal processing apparatus according to the 1125/60 system, it is required that the apparatus be provided with an additional video area encoder, which causes cost-up and increases processing burden on the apparatus. In addition, the apparatus must have enough recording capacity, since there is a need for another area in which coded data processed by the additional video area encoder is recorded. Moreover, writing and reading process at recording and reproduction, is performed to different areas, which causes processing burden to be somewhat increased.

SUMMARY OF THE INVENTION

It is an object of the present invention to provide a video signal processing apparatus which is based on a video signal processing apparatus which processes HDTV signals according to the 1125/60 system, and is realized without adding an encoder and the like thereto, wherein video comprising one frame composed of 1080 lines can be processed, and video data of the whole image can be efficiently recorded in a magnetic tape and the like.

It is another object of the present invention to provide a video signal processing method which is capable of processing video and the like comprising one frame composed of 1080 lines and recording video data of the whole image in the magnetic tape and the like by the use of the video signal processing apparatus which processes the HDTV signals according to the 1125/60 system.

Other objects and advantages of the invention will become apparent from the detailed description that follows. The detailed description and specific embodiments described are provided only for illustration since various additions and modifications within spirit and scope of the invention will be apparent to those skill in the art from the detailed description.

According to a first aspect of the present invention, a video signal processing apparatus which receives a digital video signal having arrangement of pixels frame by frame as an input, performs compressively coding to the digital video signal, and reproduces compressively coded data, comprises blocking means for performing block dividing process by dividing the video signal of one frame into first blocks each having a first format and second blocks each having a second format which is different from the first format, and performing block changing process by changing the format of the second blocks to the first format, to produce a converted video signal composed of plural blocks each having the first format; and compressive coding means for performing compressive coding including discrete cosine transform process to the converted video signal produced by the blocking means.

According to a second aspect of the present invention, in the video signal processing apparatus of the first aspect, when B, C, m, n, p, and q are natural numbers, and n=2×q and 2×m=p, the blocking means generates B pieces of first blocks each having the first format in which m pixels in the horizontal direction×n lines aligned in the vertical direction are arranged and C pieces of second blocks each having the second format in which p pixels in the horizontal direction×q lines aligned in the vertical direction are arranged, in the block dividing process, and when A≧B+C (A: natural number), the blocking means changes the second blocks into the first blocks and generates A pieces of first blocks from B pieces of first blocks and C pieces of second blocks, in the block changing process.

According to a third aspect of the present invention, in the video signal processing apparatus of the second aspect, the number of lines aligned in the vertical direction of the one frame of the input digital image signal is not an integer multiple of the n but an integer multiple of the q.

According to a fourth aspect of the present invention, in the video signal processing apparatus of the third aspect, the number of lines aligned in the vertical direction of the one frame of the input digital image signal is 1080.

According to a fifth aspect of the present invention, a video signal processing method for receiving a digital video signal having arrangement of pixels frame by frame as an input, performing compressively coding to the digital video signal, and reproducing compressively coded data, comprises a blocking step for performing block dividing process by dividing the video signal of one frame into first blocks each having a first format and second blocks each having a second format which is different from the first format, and performing block changing process by changing the format of the second blocks to the first format, to produce a converted video signal composed of plural blocks each having the first format; and a compressive coding step for performing compressive coding including discrete cosine transform process to the converted video signal produced in the blocking step.

According to a sixth aspect of the present invention, in the video signal processing method of the fifth aspect, in the blocking step, when B. C, m, n, p, and q are natural numbers, and n=2×q and 2×m=p, the block dividing process generates B pieces of first blocks each having the first format in which m pixels in the horizontal direction×n lines aligned in the vertical direction are arranged and C pieces of second blocks each having the second format in which p pixels in the horizontal direction×q lines aligned in the vertical direction are arranged, and when A≧B+C (A: natural number), the block changing process changes the second blocks into the first blocks and generates A pieces of first blocks from B pieces of first blocks and C pieces of second blocks.

According to a seventh aspect of the present invention, in the video signal processing method of the sixth aspect, the number of lines aligned in the vertical direction of the one frame of the input digital image signal is not an integer multiple of the n but an integer multiple of the q.

According to an eighth aspect of the present invention, in the video signal processing method of the seventh aspect, the number of lines aligned in the vertical direction of the one frame of the input digital image signal is 1080.

DETAILED DESCRIPTION OF THE PREFERRED EMBODIMENTS

A video signal processing apparatus of this embodiment is capable of recording/reproducing a video signal of the whole image composed of 1080 lines aligned in the vertical direction, according to a block dividing method and a block arrangement changing method which are different from those of the prior art.

Figure 1:
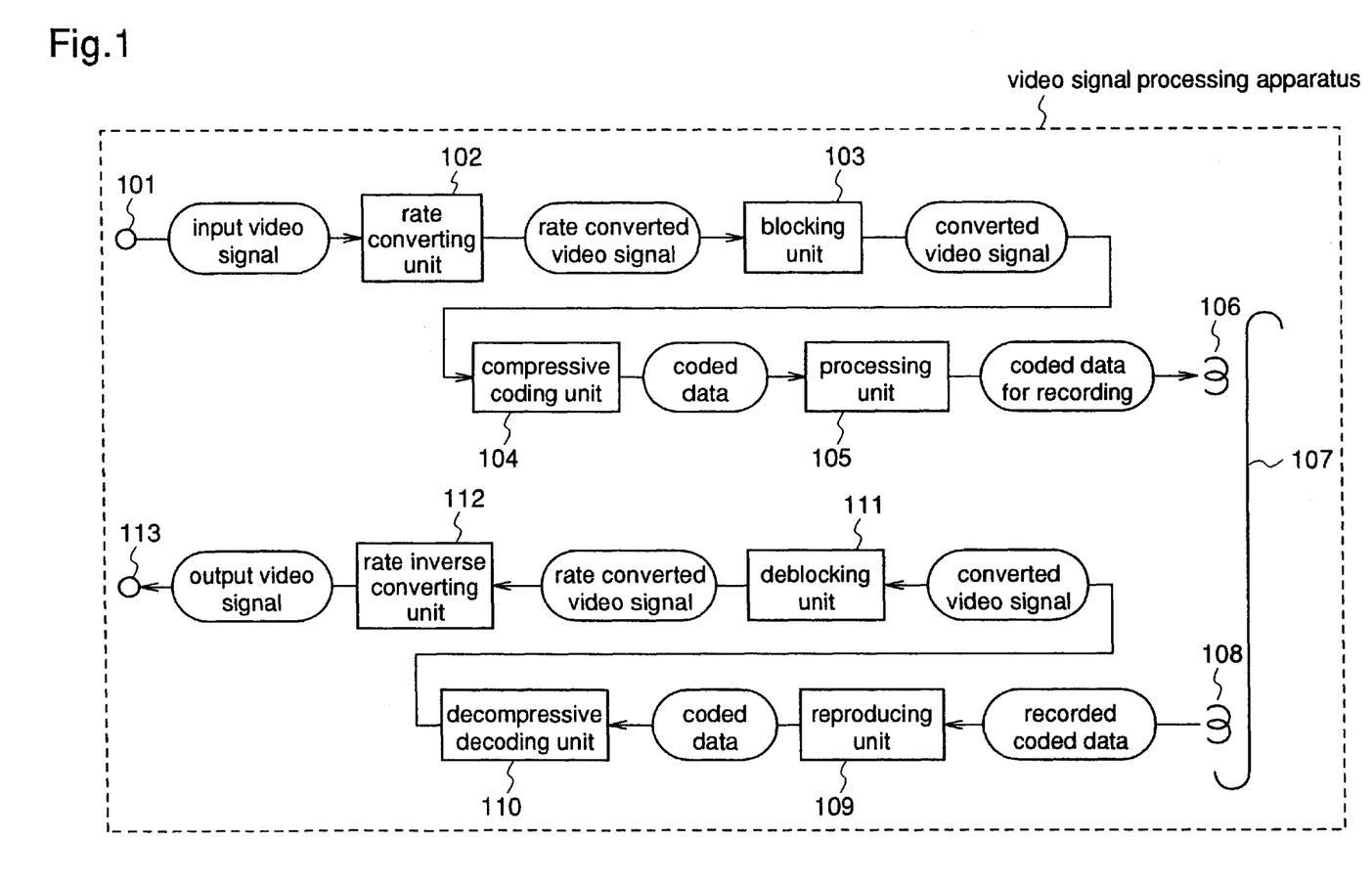
FIG. 1 is a diagram showing a video signal processing apparatus according to an embodiment of the present invention.
Figure 2:
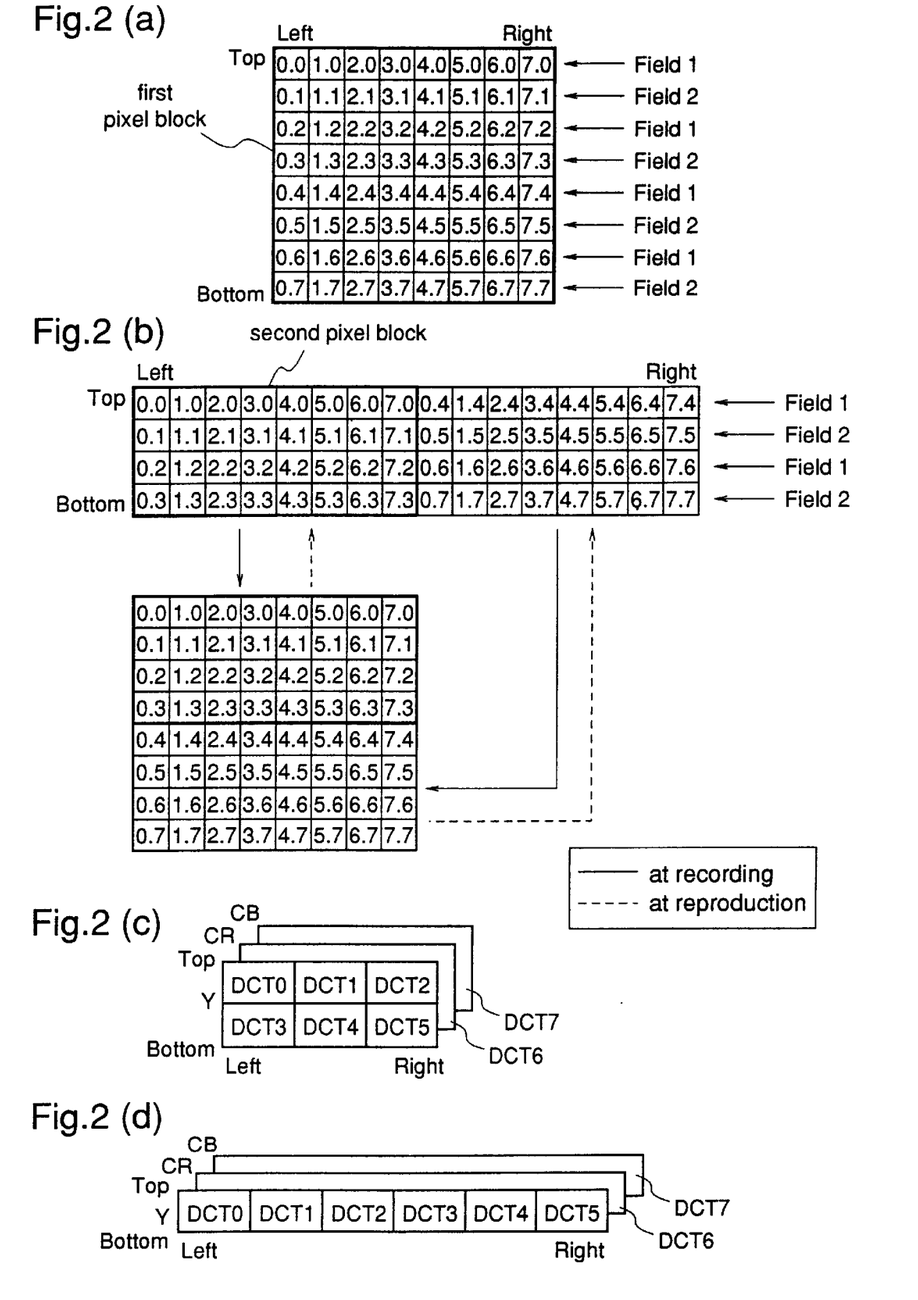
FIGS. 2(a)–2(d) are diagrams showing structures of a macroblock, DCT blocks, and pixel blocks, according to an embodiment of the present invention.

FIG. 1 is a block diagram showing a construction of the video signal processing apparatus according to this embodiment of the present invention. Referring to FIG. 1, the video signal processing apparatus includes a rate converting unit 102, a blocking unit 103, a compressive coding unit 104, a unit 105 for processing coded data to-be-recorded, a reproducing unit 109, a decompressive decoding unit 110, a deblocking unit 111, and a rate inverse converting unit 112. Through input and output terminals 101 and 113, data is input and output externally, respectively. A recording head 106 and a reproducing head 108 records and reproduces data in and from a recording medium, respectively. As the recording medium, a magnetic tape 107 is used. The rate converting unit 102, the blocking unit 103, the compressive coding unit 104, and the processing unit 105 are used in recording process. The reproducing unit 109, the decompressive decoding unit 110, the deblocking unit 111, and the rate inverse converting unit 112 are used in reproducing process.

The roles of these units are as follows. The rate converting unit 102 converts a sampling frequency of an input image signal to produce a converted video signal. The blocking unit 103 divides the converted video signal into blocks. The compressive coding unit 104 compressively codes the divided signals corresponding to blocks to produce coded data. The unit 105 processes the coded data to be handled as the signal for recording to produce the coded data for recording. The recording head 106 writes the coded data for recording into the magnetic tape 107 as the recording medium, which contains the recorded coded data. The reproducing head 108 reads the recorded coded data from the magnetic tape 107. The reproducing unit 109 processes the recorded coded data which is read by the reproducing head 108 so that it is handled as a reproduced signal, to produce coded data. The decompressive decoding unit 110 decompressively decodes the coded data so as to be adapted to processing in the compressive coding unit, to produce the converted video signal. The deblocking unit 111 subjects the converted video signal to rearrangement process, which corresponds to inverse processing of that of the blocking unit 103. The rate inverse converting unit 112 restores the sampling frequency converted by the rate converting unit 102 at recording to an original value.

FIG. 2(a)–2(d) show block structures. FIG. 3(a)–3(d) show macroblock arrangement in signal processing by the video signal processing apparatus of this embodiment. Hereinafter, a description is given of video signal recording and reproducing operation of the video signal processing apparatus with reference to FIGS. 1 through 3(a)–3(d).

Initially, the input video signal is input to the video signal processing apparatus via the input terminal 101. The input video signal is a digital HDTV signal in the 1125/60 system and comprises (1920×1080) pixels according to the SMPTE274M. A luminance signal component of the input video signal, i.e., an input luminance signal Y', has a sampling frequency of 74.25 MHz, and its one frame comprises (1920×1080) pixels. Chrominance signal components, i.e., input chrominance signals CB' and CR' have respectively a sampling frequency of 37.125 MHz, and one image thereof respectively comprise (960×1080) pixels.

The input video signal comprising the Y', CR', and CB' is input to the rate converting unit 102, which converts the sampling frequency of the Y' from 74.25 Mhz into 37.125 MHz, to produce the converted luminance signal Y comprising (960×1080) pixels. In a like manner, the sampling frequency of the CR' is converted from 37.125 MHz into 12.375 MHz, and further, every other lines thereof are reduced, to produce a converted chrominance signal CR comprising (320×540) pixels. In a like manner, the sampling frequency of the CB' is converted from 37.125 MHz into 12.375 MHz, and further, every other lines thereof are reduced, to produce a converted chrominance signal CB comprising (320×540) pixels.

The rate converting unit 102 outputs the converted luminance signal "Y", the converted chrominance signals "CR" and "CB", as a rate converted video signal, to the blocking unit 103, which divides the rate converted video signal into pixel blocks, and forms macroblocks. The number of lines aligned in the vertical direction in one frame of "Y" is 1080=16×67+8. The number of lines aligned in the vertical direction in one frame of "CR", and the number of lines aligned in the vertical direction in one frame of "CB", are respectively 540=8×67+4. As concerns the signals to be processed in the 1125/60 system according to the prior art, the number of lines in "Y" is 1024=16×64, and the number of lines in "CR" and "CB" are respectively 512=8×64. Therefore, even if the rate converted video signal of this embodiment is processed according to the prior art, macroblocks in FIG. 4 are not formed.

In this embodiment, "A. Block Dividing Process", "B. Pixel Block Changing Processs", "C. Macroblock Dividing Process", and "D. Macroblock Arrangement Changing Process" are performed to obtain data which can be compressively coded.

A. Block Dividing Process

The blocking unit 103 divides the rate converted video signal into first pixel blocks each comprising (8×8) pixels in FIG. 2(a), and second pixel blocks each comprising (16×4) pixels in FIG. 2(b).

B. Pixel Block Changing Process

As shown in FIG. 2(b), the second pixel block is divided into two partial blocks each comprising (8×4) pixels, which are vertically connected to each other, to make the first pixel block comprising (8×8) pixels. In this manner, the second pixel block is changed into the pixel block which can be subjected to DCT process.

C. Macroblock Dividing Process

The blocking unit 103, divides the one frame of the pixel blocks resulting from the block dividing process, into first macroblocks, each of which is shown in FIG. 2(c), and second macroblocks, each of which is shown in FIG. 2(d). The first macroblock corresponds to 8 DCT blocks, i.e., 6 DCT blocks (DCT 0–5) comprising (24×16) pixels in "Y", a DCT block (DCT 6) comprising (8×8) pixels in "CR", and a DCT block (DCT 7) comprising (8×8) pixels in "CB". The second macroblock corresponds to 8 DCT blocks, i.e., 6 DCT blocks (DCT 0–5) comprising (48×8) pixels in "Y", a DCT block (DCT 6) comprising (16×4) pixels in "CR", and a DCT block (DCT 7) comprising (16×4) pixels in "CB".

D. Macroblock Arrangement Changing process

The blocking unit 103 changes arrangement of the one frame of the macroblocks resulting from the macroblock dividing process as follows. The blocking unit 103, as shown in FIG. 3(a), vertically divides the upper region of one frame into blocks Ai (i=0–3) each composed of (40×1) first macroblocks. In addition, the blocking unit 103 vertically divides the lower region of one frame into blocks Ai (i=4–6) each composed of (40×1) first macroblocks and a block A7 composed of (20×1) second macroblocks. Moreover, the blocking unit 103 horizontally divides the central region except the upper and lower regions, into blocks Ci (i=1–4) each composed of (9×60) first macroblocks and a block C5 composed of (4×60) first macroblocks.

The rate converted video signal comprising (960×1080) pixels is, as shown in FIG. 3(a), composed of a region (blocks A0–A6 and C1–C5) composed of (40×67) first macroblocks and a region (block A7) composed of (20×1) second macroblocks.

Subsequently, the blocking unit 103, as shown in FIG. 3(c), changes the blocks Ai (i=0–6) each composed of (40×1) first macroblocks into blocks Bi (i=0–6) each composed of (5×8) first macroblocks. In addition, the blocking unit 101, as shown in FIG. 3(d), changes a block A7 composed of (20×1) second macroblocks into a block B7 in the following way. The pixel block changing process changes second pixel blocks of "CR" and "CB" in A7 into first pixel blocks, and horizontally divides (6×1) DCT blocks of "Y" in A7 into two sets of (3×1) blocks, which are vertically connected to each other, to form (3×2) DCT blocks. Thereby, the second macroblock in FIG. 2(d) is changed into the first macroblock in FIG. 2(c), and the block A7 is changed into the block B7 composed of (5×4) second macroblocks as shown in FIG. 3(d). The number of horizontal pixels included in the block 7 is equal to the number of horizontal pixels included in each of the blocks Bi (i=0–6), as shown in FIG. 3(b). The blocking unit 103 arranges the blocks Bi (i=0–7) at the right of the block C5, as shown in FIG. 3(b).

The above processes A–D has thus changed the one frame comprising (960×1080) pixels into one frame composed of (45×60) first macroblocks in FIG. 3(b), which has a structure of data which can be compressively coded, i.e., a structure of data which is well suited to DCT process.

Referring to FIG. 1 again, the blocking unit 103 outputs the converted video signal in which arrangement of macroblocks has thus been changed, to the compressive coding unit 104, in accordance with a prescribed order. Receiving this, the compressively coding unit 104 performs compressive coding including DCT process, to produce coded data, and outputs the coded data to the processing unit 105, which performs signal processing to produce coded data for recording, and outputs the resulting data to the recording head 106. The recording head 106 writes the coded data for recording into the magnetic tape 107 as the recording medium.

The digital HDTV signal so processed is recorded in the magnetic tape 107 as the coded data, which is in the reproducible state now.

Subsequently, a description is given of reproducing operation of the video signal processing apparatus of this embodiment with reference to FIGS. 1 through 3(a)–3(d).

The reproducing head 108 reads the recorded coded data from the magnetic tape 107, and outputs the coded data to the reproducing unit 109. Receiving this, the reproducing unit 109 performs signal processing to reproduce coded data, and outputs the coded data to the decompressive decoding unit 110, which performs decompressive decoding to produce the converted video signal, and outputs the resulting signal to the deblocking unit 111. The deblocking unit 111 performs inverse operation of that of the blocking unit 103, for this converted video signal. To be specific, in one frame composed of (45×60) first macroblocks, the blocks Bi(i=0–6) of the blocks Bi (i=0–7) at its right end are changed into the blocks Ai (i=0–6). To be more detailed, as shown in FIG. 3(c), the blocks Bi (i=0–6) each composed of (5×8) first macroblocks are changed into the blocks Ai (i=0–6) each composed of (40×1) first macroblocks.

When the block B7 is changed into the block A7, for the exact reverse of the operation in FIG. 2(b), the DCT blocks each comprising (8×8) pixels in "CR" and "CB" of the first macroblock of the block B7 are respectively divided into two sets of blocks, i.e., upper and lower blocks each comprising(8×4) pixels, which are horizontally connected to each other, to make the second pixel block comprising (16×4) pixels. As a result of this changing process, (3×2) DCT blocks in "Y" of the first macroblock are divided into two sets of blocks, i.e., upper and lower (3×1) blocks, which are horizontally connected to each other, to form (6×1) DCT blocks.

By thus changing arrangement of the first macroblock in FIG. 2(c) into arrangement of the second block in FIG. 2(d), the deblocking unit 111 changes the block B7 composed of (5×4) first macroblocks in FIG. 3(d) into the block A7 composed of (20×1) second macroblocks. As a result, the number of horizontal pixels of the block A7, the number of horizontal pixels of each of the blocks Ai (i=0–6), and the number of horizontal pixels of the blocks C1–C5 aligned in the horizontal direction, are the same. As shown in FIG. 3(a), the blocks Ci (i=1–5) is the central region, on which the blocks Ai (i=0–3) of the blocks Ai (i=0–7) are disposed as the upper region, and under which the blocks Ai (i=4–7) are disposed as the lower region. In this manner, the converted video signal of one frame has macroblock arrangement before changing process by the blocking unit 103, that is, it is composed of (40×67) first macroblocks, and (20×1) second macroblocks.

The deblocking unit 111 outputs the rate converted video signal so changed to the rate inverse converting unit 112. The rate converting unit 112 converts the sampling frequency of the luminance signal "Y" from 37.125 MHz to 74.25 MHz, to produce the luminance signal Y' comprising (1920×1080) pixels. In addition, the unit 112 converts the sampling frequency of the converted chrominance signals CR and CB from 12.375 MHz to 37.125 MHz, and performs line interpolation thereto, to produce the signals CR' and CB' each comprising (960×1080) pixels.

The rate inverse converting unit 112 outputs the video signal so restored, i.e., the digital HDTV video signal, via the output terminal 113. As a result, HDTV video composed of 1080 lines is regenerated from the digital video signal read from the magnetic tape on the video signal processing apparatus.

Thus, the video signal processing apparatus of this embodiment, comprises the rate converting unit 102, the blocking unit 103, the compressive coding unit 104, the processing unit 105, the reproducing unit 109, the decompressive decoding unit 110, the deblocking unit 111, and the rate inverse converting unit 112, and the blocking unit 103 performs block dividing process to the digital video signal composed of 1080 lines aligned in the vertical direction which cannot be divided into blocks according to the prior art, and changes arrangement thereof, to obtain a data structure for compressive coding, i.e., DCT process, the compressive coding unit 104 performs compressive coding to data to be recorded, the decompressive decoding unit 110 decompresses the coded data, the deblocking unit 111 performs inverse processing of that of the blocking unit 103 to the resulting converted video signal to restore the converted video signal of divided blocks, and further, the rate inverse converting unit 112 performs processing, resulting in the digital video signal composed of 1080 lines aligned in the vertical direction, which will become video.

The video signal processing apparatus of this embodiment is implemented with ease by changing setting of the blocking unit and the deblocking unit, based on the video signal processing apparatus which processes the HDTV signal according to the prior art 1125/60 system, and is capable of processing the video of one frame composed of 1080 lines with no additional equipment or no increase in processing burden.

As concerns the recording medium, recording is not performed in separate areas of the recording medium, and therefore effective use of the medium which has a limited capacity is realized. Besides, writing/reading process at recording/reproduction onto/from the recording medium is efficiently performed.

Figure 3:
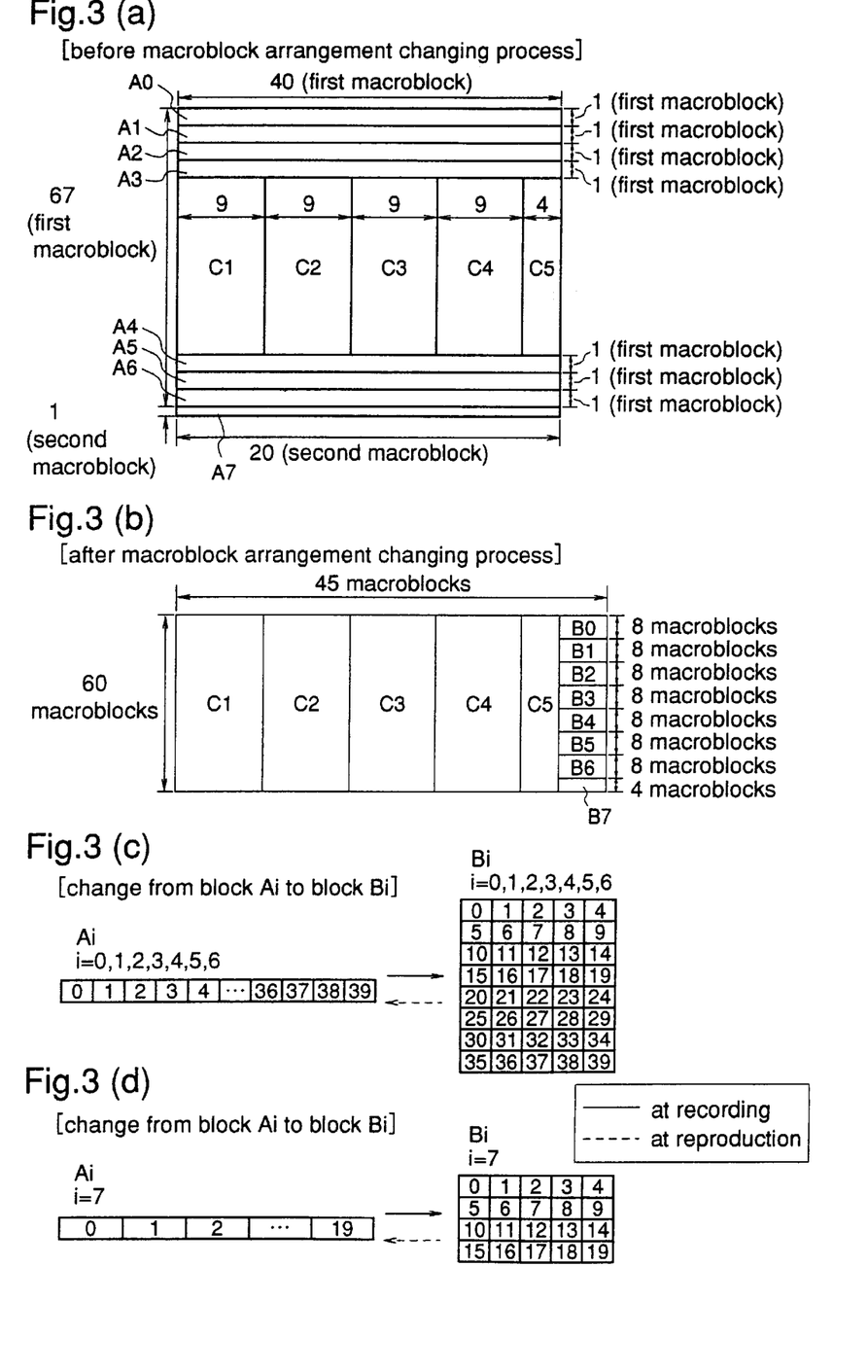
FIGS. 3(a)–3(d) are diagrams showing arrangement of macroblocks and macroblock arrangement changing process, according to an embodiment of the present invention.

While in the above description the upper and lower regions of the converted video signal of one frame are composed of 64 lines and 56 lines, respectively, as shown in FIG. 3(*a*), the number of the lines is not restricted thereto, and the lines may be collected into one side. For example, the upper and lower regions may be composed of 80 lines and 40 lines, respectively.

In addition, while in the above description the second macroblocks are disposed at the lowermost portion of one frame, they may be disposed in any portion of the upper or lower region.

Suppose that "A" is the number of macroblocks of one image which can be compressively coded (A: natural number), "B" is the number of first macroblocks each comprising (m×n) pixels (m, n: natural number), and "C" is the number of second macroblocks each comprising (p×q) pixels (p, q: natural number). The following figures are used in this embodiment.

A=45×60=2700, B=40×67=2680, C=20
(Y): m=24, n=16, p=48, q=8,
(CR, CB): m=8, n=8, p=16, q=4

As alternatives, the following examples are possible.

Example 1) One frame of a video signal comprises (1280×1080) pixels, and
A=90×60=5400, B=80×67=5360, C=40
(Y): m=16, n=16, p=32, q=8
(CR, CB): m=8, n=8, p=16, q=4

Example 2) In one frame of a video signal, "Y" comprises (1280×1080) pixels, and "CR" and "CB" respectively comprise (640×1080) pixels, and
A=90×60=5400, B=80×67=5360, C=40
(Y): m=16, n=16, p=32, q=8
(CR, CB): m=8, n=16, p=16, q=8

Example 3) One frame of a video signal comprises (1920×540) pixels, and
A=4320, B=64×67=4288, C=32
(Y): m=30, n=8, p=60, q=4
(CR, CB): m=15, n=8, p=30, q=4

Example 4) One frame of a video signal comprises (1920×540) pixels, and
A=4352, B=64×67=4288, C=32
(Y): m=30, n=8, p=60, q=4
(CR, CB): m=15, n=8, p=30, q=4

In this case, 32 macroblocks comprising imaginary pixel data at a fixed level are used as dummy macroblocks. That is, A=B+C+(the number of dummy blocks). Thus, various combinations to satisfy n=2×q, 2×m=p, A≧B+C are possible.

Moreover, while the HDTV signal in the 1125/60 system is used as the video signal, a video signal in 525/60 system or the like may be used in signal processing which satisfies the above equation.

What is claimed is:

1. A video signal processing apparatus which receives a digital video signal having arrangement of pixels frame by frame as an input, performs compressively coding to the digital video signal, and reproduces compressively coded data, said apparatus comprising;

blocking means for performing block dividing process by dividing the video signal of one frame into first blocks each having a first format and second blocks each having a second format which is different from the first format, and performing block changing process by changing the format of the second blocks to the first format, to produce a converted video signal composed of plural blocks each having the first format; and compressive coding means for performing compressive coding including discrete cosine transform process to the converted video signal produced by the blocking means.

2. The video signal processing apparatus of claim 1 wherein, when B, C, m, n, p, and q are natural numbers, and n=2×q and 2×m=p, the blocking means generates B pieces of first blocks each having the first format in which m pixels in the horizontal direction×n lines aligned in the vertical direction are arranged and C pieces of second blocks each having the second format in which p pixels in the horizontal direction×q lines aligned in the vertical direction are arranged, in the block dividing process, and when A≧B+C (A: natural number), the blocking means changes the second blocks into the first blocks and generates A pieces of first blocks from B pieces of first blocks and C pieces of second blocks, in the block changing process.

3. The video signal processing apparatus of claim 2 wherein the number of lines aligned in the vertical direction of the one frame of the input digital video signal is not an integer multiple of the n but an integer multiple of the q.

4. The video signal processing apparatus of claim 3 wherein the number of lines aligned in the vertical direction of the one frame of the input digital video signal is 1080.

5. A video signal processing method for receiving a digital video signal having arrangement of pixels frame by frame as an input, performing compressively coding to the digital video signal, and reproducing compressively coded data, said method comprising:

a blocking step for performing block dividing process by dividing the video signal of one frame into first blocks each having a first format and second blocks each having a second format which is different from the first format, and performing block changing process by changing the format of the second blocks to the first format, to produce a converted video signal composed of plural blocks each having the first format; and a compressive coding step for performing compressive coding including discrete cosine transform process to the converted video signal produced in the blocking step.

6. The video signal processing method of claim 5 wherein, in the blocking step, when B, C, m, n, p, and q are natural numbers, and n=2×q and 2×m=p, the block dividing process generates B pieces of first blocks each having the first format in which m pixels in the horizontal direction×n lines aligned in the vertical direction are arranged and C pieces of second blocks each having the second format in which p pixels in the horizontal direction×q lines aligned in the vertical direction are arranged, and when A≧B+C (A: natural number), the block changing process changes the second blocks into the first blocks and generates A pieces of first blocks from B pieces of first blocks and C pieces of second blocks.

7. The video signal processing method of claim 6 wherein the number of lines aligned in the vertical direction of the one frame of the input digital video signal is not an integer multiple of the n but an integer multiple of the q.

8. The video signal processing method of claim 7 wherein the number of lines aligned in the vertical direction of the one frame of the input digital video signal is 1080.

* * * * *